United States Patent [19]

Sinkinson et al.

[11] Patent Number: 4,905,725
[45] Date of Patent: Mar. 6, 1990

[54] UNDERGROUND ACCESS BOX AND VALVE OPERATING AND PROTECTING MEANS

[75] Inventors: Thomas S. Sinkinson, Broomfield; Landis O. Morris, III, Englewood, both of Colo.

[73] Assignee: Mylon C. Jacobs Supply Company, Broken Arrow, Okla.

[21] Appl. No.: 292,316

[22] Filed: Dec. 30, 1988

[51] Int. Cl.⁴ .............................................. F16L 5/00
[52] U.S. Cl. .................................. 137/370; 137/369; 137/365; 137/797
[58] Field of Search ..................... 52/20; 137/365, 369, 137/370, 797; 251/292

[56] References Cited

U.S. PATENT DOCUMENTS

| | | | |
|---|---|---|---|
| 520,542 | 5/1894 | Ryan | 137/369 |
| 621,448 | 3/1899 | Dwyer | 137/370 |
| 1,325,393 | 12/1919 | Calhoun | 137/369 |
| 2,931,383 | 4/1960 | Handley | 137/369 |
| 4,030,696 | 6/1977 | Bake et al. | 251/292 |
| 4,051,866 | 10/1977 | Bake et al. | 137/797 |
| 4,497,344 | 2/1985 | Kisiel | 137/797 |

Primary Examiner—A. Michael Chambers
Attorney, Agent, or Firm—Head & Johnson

[57] ABSTRACT

An underground access box and valve operating and protecting means are disclosed. The access box comprises a pair of valve enclosing members adapted to be fitted together to enclose a valve and present an upward extension through which the valve can be reached. The valve enclosing members have a generally planar bottom, an open side, and an upwardly extending side portion. The bottom projects beyond a side portion and a flange extends upwardly from the bottom portion along a side portion. The valve operating means comprises a high-head comprising an elongated central portion, an upper operating nut portion, and a lower valve nut socket portion, at least one of which is melt fused to the central portion so as to be severed from the central portion if the high-head is exposed to torque which would damage the valve or the line to which the valve is connected. Further, an adapter is provided which enables one to use a square head valve operating socket on a flat head valve nut. Means are also disclosed to make an all-plastic access box-valve assembly locatable by magnetic or electronic detection and to alert workmen as to the utility associated with the valve by a color coding.

9 Claims, 4 Drawing Sheets

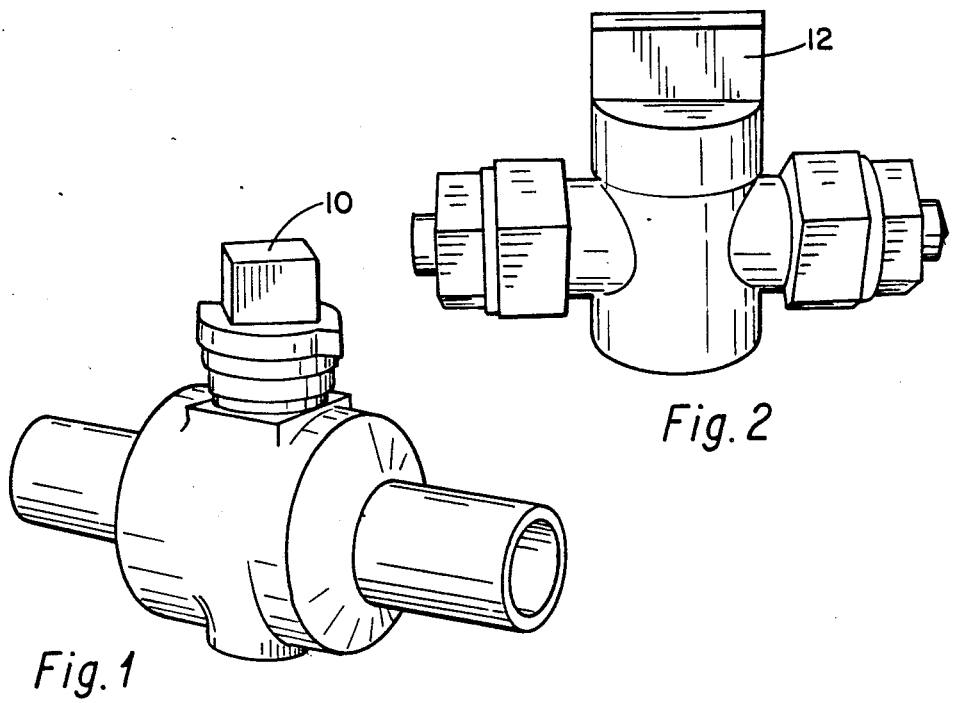
Fig. 1
Fig. 2
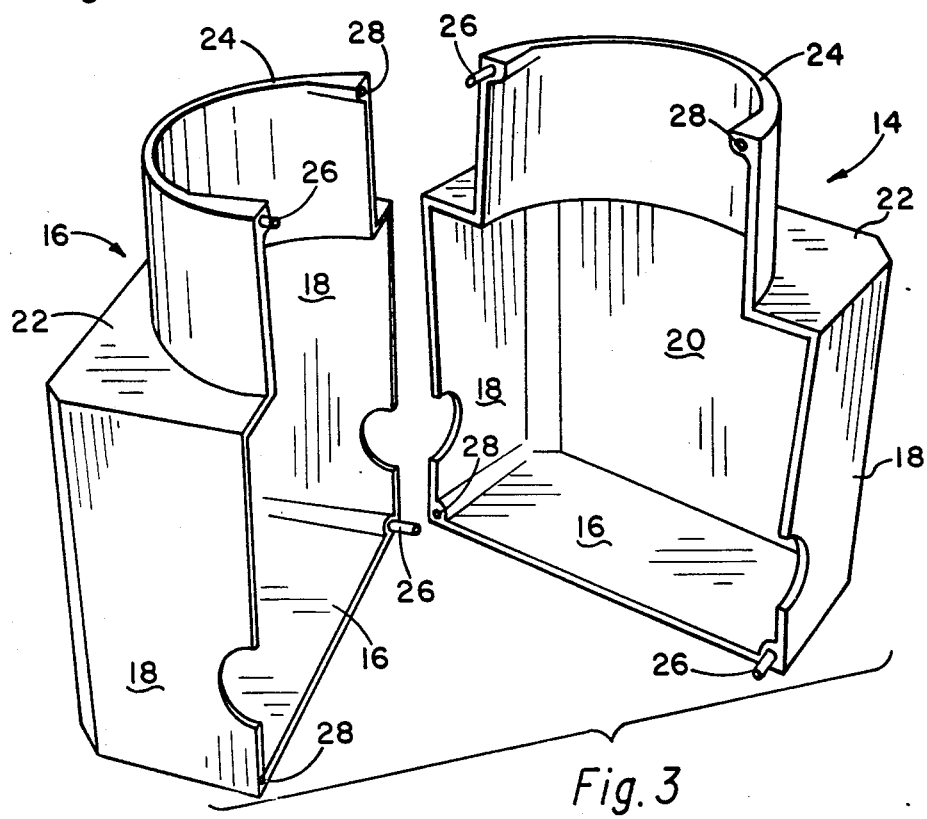
Fig. 3

UNDERGROUND ACCESS BOX AND VALVE OPERATING AND PROTECTING MEANS

FIELD OF THE INVENTION

The present invention relates underground access boxes and valve operating means for use with underground valves, such as those being commonly employed in water, gas, electric, telephone, water, and sewer lines that are buried underground.

BACKGROUND OF THE INVENTION

When underground lines are laid, it is generally necessary and/or desirable, to have one or more underground valves in the lines for use in controlling the flow of the material through the lines. Even if valves are not present in the lines, it is generally desirable to have access boxes which allow one to obtain access to the underground line at various locations.

The use of underground valves has necessitated the use of valve boxes, also often referred to as "curb" boxes, to allow one a means of obtaining access to the valves without having to dig down in the earth to uncover the valve.

The curb boxes currently in use are generally tubular casings having an enlarged lower bell housing that encompasses the valve. The upper end of the valve box generally includes a cover which is generally flush with the ground surface. Typically, an elongated wrench is used to reach down into the curb box to turn the valve operating knob, which is often referred to as a valve head.

Early curb boxes were constructed of cast iron, and most lines and valves were also metallic. With the advent of synthetic polymeric materials, the lines, valves, and boxes are now being replaced with similar components formed of synthetic plastic. Although synthetic plastic lines and valves are more resistant to the deterioration that accompanies the corrosion and aging of metal, the use of synthetic plastic components raises other engineering considerations that were not posed by early metallic components. For example, the use of plastic valves and plastic lines generally makes it more critical that the valve operating head not be exposed to torque that would damage either the line, the valve, or the valve line connection.

An object of the present invention is to provide a valve box which helps preclude the shifting of the valve relative to the line when the valve operating head is turned.

Another object of the present invention is to provide an elongated valve operating device, or high head, which includes a frangible component which is designed to shear if force is applied which might damage the valve or line.

Still another object of the present invention is to provide means allowing for the location of underground non-metallic valves or lines with a metal detector.

Still yet another object of the present invention is to provide an adaptor which allows one to use one elongated valve operating device for both of the two types of valve heads that are now generally encountered.

Still yet another object of the present invention is to provide access boxes and/or operating heads which are constructed of a synthetic plastic which is color-coded to designate the type of utility line with which they should be employed.

Other aspects, objects, and advantages of the present invention will be apparent to one having the benefit of the following disclosure and its accompanying drawing.

BRIEF DESCRIPTION OF THE DRAWINGS

FIG. 1 is a perspective view from above and slightly to the left of a typical all-plastic valve having a square head operating nut.

FIG. 2 is a perspective view from above and to the right of a typical all-plastic valve having a flat head operating nut.

FIG. 3 is a perspective view of a pair of inventive devices capable of enclosing a standard all-plastic valve such as one of those shown in FIGS. 1 and 2.

SUMMARY OF THE INVENTION

Figure 4:
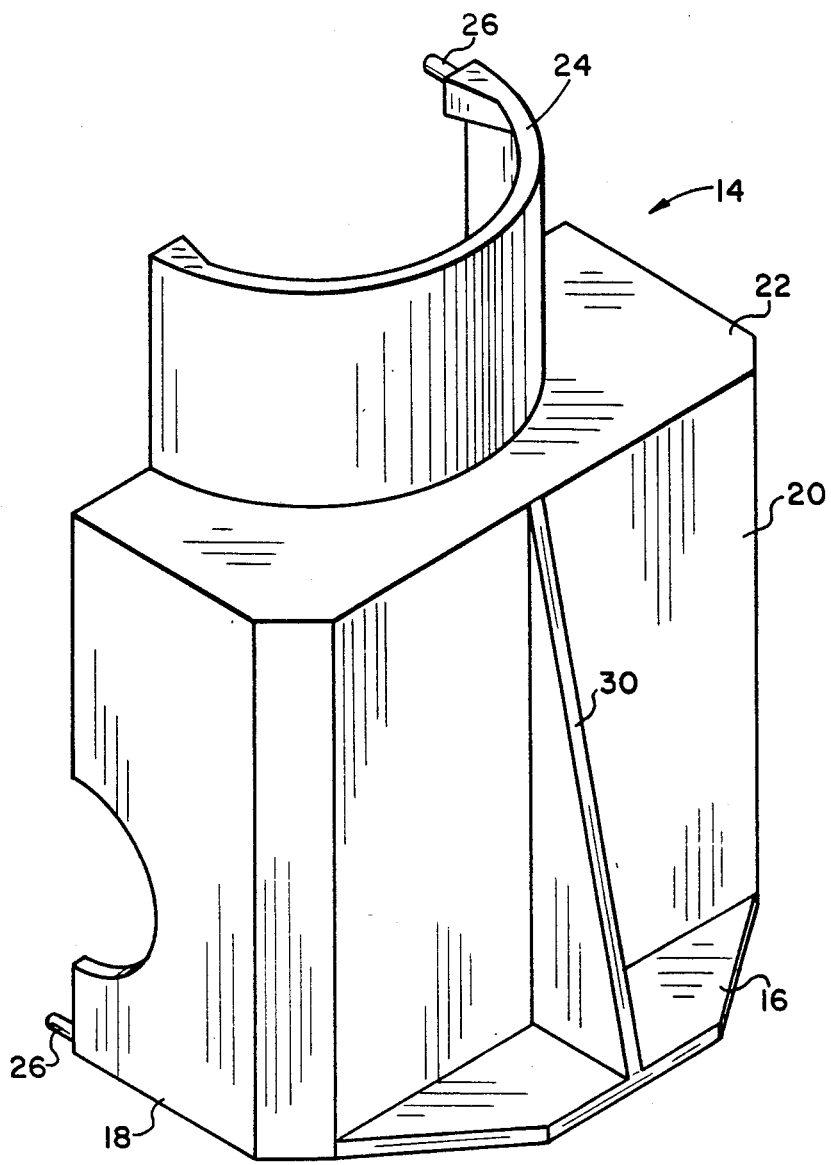
FIG. 4 is a rear perspective view of one of the inventive devices of FIG. 3.

In accordance with the present invention, there is provided a novel encasing member which when fitted together with another similarly shaped encasing member provides a valve box comprising a lower portion capable of enclosing a valve and an upwardly extending portion capable of being surrounded by a tubular barrel to secure the two encasing members together. The encasing members are constructed such that when fitted together there is an opening allowing one to gain access to the inside of the valve box through the tubular barrel. To some extent the inventive valve box is similar to the valve box shown in U.S. Pat. No. 1,325,393. The inventive encasing members include a generally planar bottom portion, an open side, and side portions extending upwardly from said bottom portions. Notches are included in opposed side portions of the encasing member adjacent the open side for receiving opposite ends of a valve or line. The bottom portion projects rearwardly of the side portions opposite the open side, and a generally vertical flange extends upwardly from the projecting portion of the bottom portion and rearward from the side portion opposite the open side.

In accordance with another aspect of the present invention, there is provided a valve enclosure service box assembly comprising a pair of the above-described novel encasing members surrounded by a lower barrel which secures the two encasing members together. The lower barrel is in turn surrounded by an upper barrel, a portion of which extends upwardly above the lower barrel. In a preferred embodiment the lower barrel has outwardly extending threads, and the upper barrel has matching inwardly extending threads adapted so as to allow the upper barrel to be raised or lowered relative to the lower barrel by turning the upper barrel.

In accordance with yet another aspect of the present invention, there is provided a novel, frangible high-head comprising an elongated central portion, an operating nut portion, and a lower valve nut receiving socket portion. The upper operating nut portion or the lower valve nut receiving socket portion are melt fused to the elongated central portion. The strength of the area of melt fusion is selected so that the area of melt fusion will shear if the high-head is exposed to torque which would damage the valve or line to which the valve is attached.

In accordance with still another aspect of the present invention, there is provided a flat head valve adapter which can be inserted inside the socket of a device used in controlling a valve having a square-head operating nut so that the same device can be used on a valve having a flat head operating nut.

Still another aspect of the present invention is an assembly having all the components mentioned in the preceding four paragraphs.

DETAILED DESCRIPTION OF THE INVENTION

FIGS. 1 and 2 illustrate the two types of all-plastic valves that are now generally employed with underground plastic pipe. The valve of FIG. 1 is a valve having a square-head operating nut 10. In some cases such operating nuts have tapered upper surfaces, but in all such valves the main portion of the nut has a square horizontal cross-section. The valve of FIG. 2 is one having a flat head operating nut 12. The so-called flat head operating nut comprises a narrow flange which extends vertically upward from the valve.

A typical example of valve enclosing members of the present invention are shown in FIGS. 3 and 4. A valve box is formed from a pair of valve enclosing members 14 and 16 which comprise generally rectangular open-faced boxes having on the upper surface a semi-circular extension. In the illustrated embodiments, each enclosure member includes a generally planar bottom portion 16, two opposing sidewall portions 18, and a rear sidewall portion 20. In this particular illustrated embodiment, the junction between the sidewalls and the rear wall is beveled as shown. The upper surface comprises a generally planar top surface 22 having a semi-circular flange 24 extending upwardly therefrom. There is an opening in the top surface 22 that is coextensive with the inside of the semi-circular flange 24. There are semi-circular notches cut into the free edges of the opposed sidewalls 18. The size of these notches can be readily varied to conform to the type of valve being employed. The free edges of the open face of the enclosing members 14 and 16 further include outwardly projecting pins 26 adapted to snap into oppositely located channel openings 28 of the opposite enclosing member counterpart to aid in securing the two halves of the valve box together and to help prevent one-half of the valve box from shifting vertically or horizontally with respect to the other half.

FIG. 4 shows a rear view of a typical one of the valve enclosing members of FIG. 3. As illustrated, the bottom portion 16 projects outwardly beyond the rear wall 20. A flange 30 further projects outwardly from the rear wall and downwardly to the upper surface of the projecting part of the bottom portion 16. By having the bottom portion project rearwardly of the rear wall and by having a flange as shown, one obtains a more secure box after the hole receiving the same has been backfilled. The extent to which the bottom portion 16 and the flange 30 project can be varied as desired. In the currently preferred embodiment the components project outwardly about one to two inches from the rear wall.

Figures 5, 6, 7:
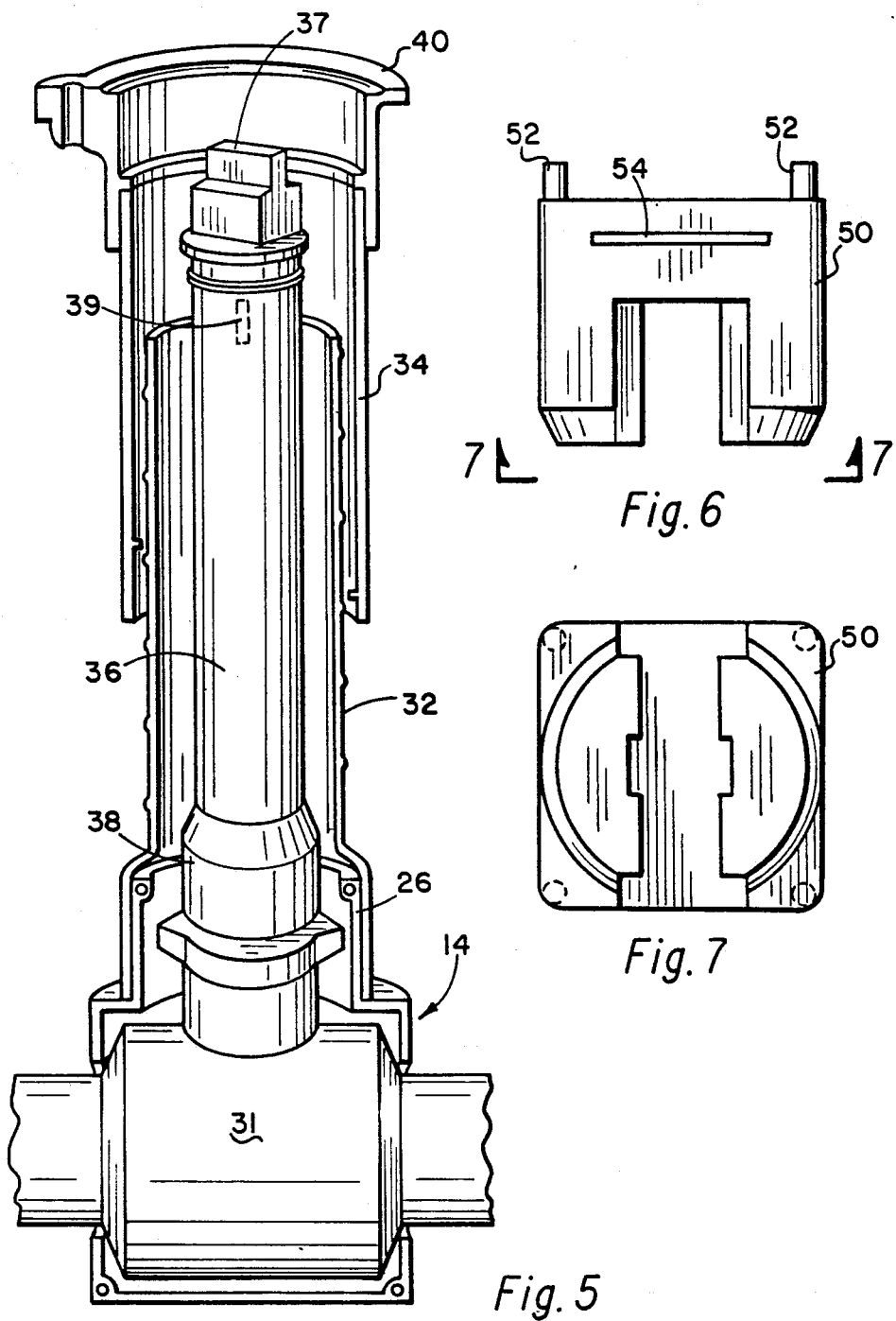
FIG. 5 is a partial cross-sectional view of a valve box assembly employing enclosure means of the type shown in FIG. 3 and a novel elongated high-head in conjunction with a valve of the type shown in FIG. 1.
FIG. 6 is a front view of a square high-head adapter which can fit inside the standard socket used for standard square head valve operating nuts so that the socket can be used on a standard flat head operating nut.
FIG. 7 is a bottom plane view of the flat head valve adapter of FIG. 6.

FIG. 5 is a partial cross-sectional view showing how the inventive enclosing members can be employed to protect and secure a valve. In this illustration the enclosure member 14 is positioned around the valve 31. A lower tubular barrel 32 extends downwardly around the upwardly extending flange 26 of both halves of the valve protecting box. The lower barrel 32 has on its outer surface a plurality of outwardly extending ribs adapted to act as threads. An upper tubular barrel 34 surrounds an upper portion of the lower barrel 32. The upper barrel has on its inside surface inwardly extending ribs adapted to fit into the outwardly extending ribs of the lower barrel so that the upper barrel can be raised and lowered relative to the lower barrel by the rotation of the upper barrel. Extending upwardly from the valve 31 within both the lower barrel 32 and the upper barrel 32 is a valve operating device often referred to as a high-head. The illustrated high-head comprises an elongated tubular central portion 36, an operating nut portion 37, and a valve nut receiving socket portion 38. In a preferred embodiment, a detectable device 39 is secured within the tubular extension 36. The detectable device could be a strip of metal or magnet or a typical detectable bullet of the type generally supplied with underground detecting equipment currently being sold by the 3M Company. A standard vented cap 40 capable of receiving a standard locking lid is positioned around the upper end of the upper barrel 34.

In an especially preferred embodiment all the components described except for the detecting means 39 are composed of a suitable, moldable synthetic plastic. Typical examples would include polyethylene, polypropylene, and ABS polymer. In an especially preferred embodiment, one or more of these thermoplastic components is colored throughout with a dye which is of a color to alert workers as to the type of utility that is located beneath the components. In such a situation, the color red would indicate electrical components, the color yellow would indicate gas or oil transmission, orange would indicate telephone or cable T.V. components, blue would indicate water transmission, and green would indicate sewer transmission.

FIG. 3 provides a more detailed view of an inventive high-head valve operating device. In a preferred embodiment the socket portion 38, the central portion 36, and the operating nut portion 37 are all composed of melt-fusible polyethylene of the type currently found in use in polyethylene pipelines. When the individual components are composed of such material, it has been found possible to assemble the components into the illustrated high-head by using the typical butt fusion procedure that is generally used currently for connecting lengths of polyethylene tubing. Typically the procedure of bonding the operating nut portion 37 to the central portion 36 would involve aligning the pieces in a jig, facing the pieces till stops are in contact with the jig, removing any tailings that may be present on the end of the pipe. Once the parts were in alignment, a heater would be inserted. Heat at around 500° F. would be applied to the end of the central portion 36 and the operating nut portion 37. Pressure would be applied on the heater until a melted pattern shows on the full circumferences of both pieces. Thereafter the two heated portions are brought together with pressure to form two distinct beads shown as 42 in the attached drawing. By varying the butt fusion conditions, it is possible to produce devices in which the strength of the butt fusion can be varied as desired. The socket portion can be connected to the central portion in a similar manner.

Figures 8, 9, 10:
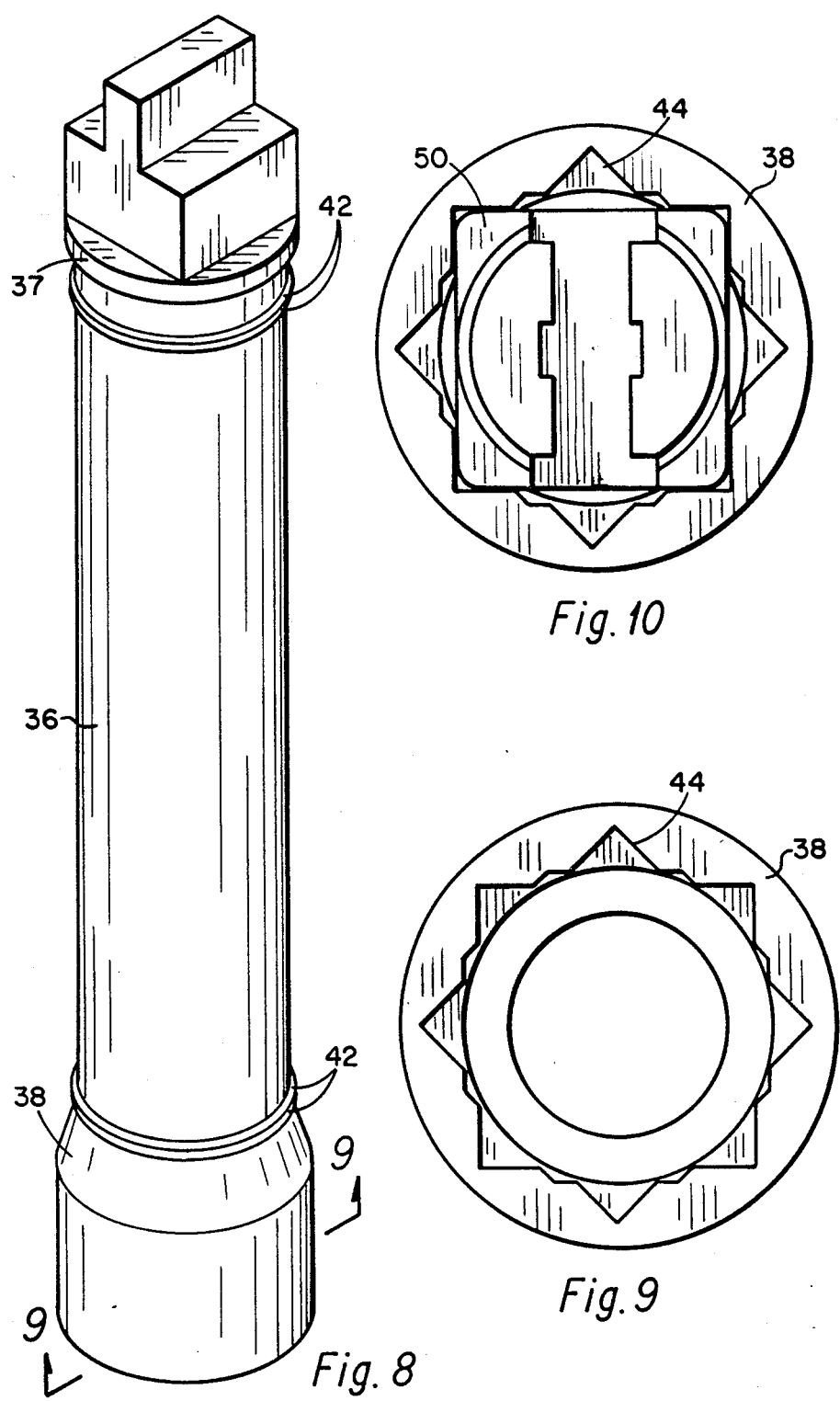
FIG. 8 is a perspective view of an inventive high-head.
FIG. 9 is a bottom plane view of the high-head of FIG. 8 taken along lines A—A to illustrate the socket opening for a standard square head valve operating nut.
FIG. 10 is a bottom view of the socket portion of the high-head of FIG. 8 with an adapter of the type shown in FIGS. 6 and 7 inserted into the socket to allow the high-head to be employed on a standard flat head valve operating nut.

FIG. 9 shows a bottom view of the socket receiving portion 38. In this particular embodiment, the bottom of the socket portion contains an opening which can be viewed as two square openings having a common central point wherein the corners of one of the square openings are located midway between the corners of the other square opening. This arrangement allows the operating head to accept a standard square head operating nut in at least two positions. Such an opening could be referred to as an 8-sided star opening.

FIGS. 6 and 7 illustrate an adapter device which can be employed with the socket portion of the high-head of FIG. 8 to enable the high-head to be capable of controlling a valve having a standard flat head operating nut rather than a square head operating nut. The adapter comprises a generally square block of material 50 which is capable of fitting within the socket of a valve operating device designed to receive a square head valve nut. On the lower surface of the adapter there is included a slot which extends upwardly. The slot is sufficiently wide to accept a standard flat head valve operating nut. In a preferred embodiment the upper surface of the generally square block 50 includes four upwardly extending pins 52 which have been found to help ensure that the adapter can be readily removed from a valve operating socket. In an especially preferred embodiment a metallic or magnetic or otherwise locatable device 54 is embedded into the adapter so that the location of the underlying valve can be detected from above the ground by means of an electronic or magnetic detecting device.

FIG. 10 illustrates how the adapter of FIGS. 6 and 7 can be inserted into a socket of the type shown in FIG. 9. It should be recognized that while this adapter has been shown in conjunction with the inventive high-head, it could also be applied to standard wrenches of the type often employed by workmen for controlling underground valves having square head valve nuts.

While the present invention now has been described in general and in regard to some specific preferred embodiments, it should be recognized that various modifications and variations can be made without departing from the spirit and scope of the present invention. For example, the assembly shown in FIG. 5 could be made detectable by placing a detectable ring around the lower barrel 32 so that it rests upon the upper surface of the enclosing members 14. Such detectable rings are currently available for use with a detecting device sold by the 3M Company. Another option involves modifying the high head so that it is firmly secured to the valve. This can be accomplished by pinning the socket portion 38 to the operating nut of the valve. Such pinning can be accomplished by first drilling a hole through the valve's operating nut and through the socket portion of the high head and then inserting a pin through the resulting opening. The pin could be heated if desired to permanently affix the high head to the valve. If the adapter 50 is employed one would also have to drill a suitably located hole through the adapter.

What is claimed is:

1. A valve enclosing member capable of supporting and enclosing approximately one-half of a valve, said enclosing member comprising a generally planar bottom portion, a sidewall portion extending upwardly from the bottom portion so as to extend halfway around the valve from opposite end portions of said valve, an upper portion presenting an opening for access to said valve and being capable of fitting within a tubular casing, wherein there are notches on the free edge of opposing portions of sidewall adapted to support opposite ends of the valve, and wherein the bottom portion projects outwardly beyond the sidewall portion and at least one generally vertical flange projects outwardly from said sidewall and downwardly to a portion of the bottom portion which projects outwardly from the sidewall.

2. A valve enclosing member according to claim 1 wherein said sidewall portion comprises two generally planar front walls which intersect a generally planar rear wall.

3. A valve enclosing member according to claim 2 further including a generally planar top surface extending across the top of said sidewall portion, said top surface having a notch on its free edge and an upstanding semi-tubular extension surrounding the notch.

4. A valve enclosing member according to claim 3 wherein there is at least one pin extending outwardly from a free edge of said sidewall portion and at least one pin accepting channel associated with a free edge of a sidewall portion, said pin accepting channel being capable of receiving a similar pin from a counterpart valve enclosing member.

5. A valve enclosing member according to claim 4 wherein there is at least one outwardly extending pin and at least one pin receiving channel associated with a free edge of said upstanding semi-tubular extension.

6. A valve enclosing member according to claim 5 wherein said semi-tubular extension has a semi-circular horizontal cross-section.

7. A valve box comprising a pair of valve enclosing members, each said valve enclosing member having a generally planar bottom portion, an open front side for receiving a valve, a sidewall portion extending halfway around a valve from opposite end portions of said valve, notches on opposing sides of the sidewall portion adapted to support opposite ends of a valve, an upper portion presenting an opening for access to said valve, the upper portion of said enclosing members being capable of fitting within a tubular casing which can serve to hold the pair of enclosing members together when the open front sides of the two enclosing members are abutted against each other around a valve, and wherein the bottom portion of each enclosing member projects outwardly beyond the sidewall portion and wherein there is a flange projecting outwardly from the sidewall portion and downwardly to a portion of the bottom which projects outwardly from the sidewall.

8. A valve box according to claim 7 wherein said pair of enclosing members when abutted together to surround a valve to present a generally rectangular box having a tubular extension on the upper end.

9. A service box-valve operating assembly comprising a pair of valve enclosing members surrounding a valve to form a valve box, each of said enclosing members comprising a generally planar bottom portion so as to extend halfway around the valve from opposite end portions of said valve, an upper portion presenting an opening for access to said valve and being capable of fitting within a tubular casing, wherein there are notches on the free edge of opposing portions of sidewall adapted to support opposite ends of the valve, and wherein the bottom portion projects outwardly beyond the sidewall portion and at least one generally vertical flange projects outwardly from said sidewall and downwardly to a portion of the bottom portion which projects outwardly from the sidewall, a tubular lower barrel fitted around the upper portion of the valve box, a tubular upper barrel fitted around the lower barrel and being vertically adjustable relative to said lower barrel, and a valve operating device extending upwardly from the operating nut of said valve through said lower barrel and into said upper barrel, said valve operating device comprising an elongated central portion of fusible plastic, an operating nut portion secured to the upper end of said central portion, and a valve nut receiving socket portion secured to the lower end of said central portion, wherein at least one of said operating nut portion and said socket portion are fusible plastic and melt fused to said central portion such that the area of melt fusion will fail if the operating device is exposed to a selected amount of torque.

* * * * *